United States Patent [19]

Uchytil

[11] 3,862,875

[45] Jan. 28, 1975

[54] FILLER MASKING OF SMALL APERTURES

[75] Inventor: Gary Uchytil, Campbell, Calif.

[73] Assignee: Micro Science Associates, Mountain View, Calif.

[22] Filed: July 3, 1972

[21] Appl. No.: 268,411

Related U.S. Application Data

[62] Division of Ser. No. 125,098, March 17, 1971, Pat. No. 3,725,215.

[52] U.S. Cl. .................... 161/38, 161/145, 161/146, 161/213, 161/406, 204/15

[51] Int. Cl. ............................ B32b 3/10, B32b 7/04

[58] Field of Search ........... 161/109, 146, 213, 406, 161/38, 145; 117/5.5, 6; 204/15; 96/35.1

[56] References Cited

UNITED STATES PATENTS

| | | | |
|---|---|---|---|
| 2,934,479 | 4/1960 | Deer | 204/15 |
| 3,325,376 | 6/1967 | Bussolini et al. | 204/15 X |
| 3,349,480 | 10/1967 | Rashleigh | 204/15 X |
| 3,390,061 | 6/1968 | Levinos | 204/15 |
| 3,449,221 | 6/1969 | Thomas | 204/15 |
| 3,556,794 | 1/1971 | Margerum | 96/35.1 X |
| 3,663,376 | 5/1972 | Uchytil et al. | 204/15 |

FOREIGN PATENTS OR APPLICATIONS

| | | | |
|---|---|---|---|
| 544,670 | 8/1957 | Canada | 204/15 |

OTHER PUBLICATIONS

"Riston," E. I. du Pont de Nemours & Co. (Inc.), pages 1–12.

*Primary Examiner*—George F. Lesmes
*Assistant Examiner*—Lorraine T. Kendell
*Attorney, Agent, or Firm*—Townsend and Townsend

[57] ABSTRACT

Relatively small apertures or passages in a sheet are masked to prevent the plating of the apertures during the electroplating of remaining portions of the sheet by filling the apertures with a readily deformable, photohardenable material. A facing is applied to one side of the sheet to retain the deformable material in the apertures until the material has been subjected to radiant energy and thereby hardened. Remaining surface portions of the sheet are then conventionally electroplated and thereafter the sheet is immersed in a dissolving agent to strip the photohardenable material and bare the apertures for subsequent use of the sheet.

1 Claim, 5 Drawing Figures

FILLER MASKING OF SMALL APERTURES

This is a division, of application Ser. No. 125,098, filed Mar. 17, 1971 now U.S. Pat. No. 3,725,215.

BACKGROUND OF THE INVENTION

The present invention relates to the economic masking of apertures, and particularly of relatively small sized apertures in the order of about 10 to 12 millimeters down to as small as a fraction of a millimeter for preparing the sheet for subsequent work. The present invention is especially well adapted for the masking of apertures during electroplating processes to prevent the plating of the apertures. It is however apparent that the masking can be employed for other tasks, such as painting, spraying, etching and like surface treating methods in which the apertures are to be closed.

Various manufacturing processes, such as the manufacture of so-called lead frames employed in integrated circuits require the masking of portions of the sheet to print, e.g., plate on, or to delete, e.g., etch thin metallic layers from base sheets. In some instances, particularly in the manufacture of lead frames which have large numbers of small apertures or passages it is highly desirable to prevent the plating of apertures of such frames to enhance the performance characteristics of the frame, to reduce the amount of plating material, such as expensive gold deposited on the frames and to facilitate the ease with which plastic sealants are applied to the finished semiconductor device since such plastic sealants adhere substantially better to the lead frame base metal than to gold.

Lead frames are usually etched in relatively large sheets which are simultaneously plated before they are severed into individual lead frames. To prevent the plating of the apertures, each aperture of the sheet must be masked. Attempts have heretofore been made to mask the apertures with plastic materials or the like. Such attempts either failed to adequately mask the apertures or were so expensive that they could not be economically employed. Consequently, the apertures in prior art lead frames and the like were usually plated which resulted in a lowering of their performance characteristic and an increase in the consumption of very expensive plating metals. Moreover, to assure the adherence of the plastic sealant it is usually necessary to remove the plating from parts of the lead frame. This is a tedious, time consuming operation that substantially increases the cost of the finished device.

SUMMARY OF THE INVENTION

The present invention provides a method for masking apertures in sheets for the subsequent plating of sheet surface portions excluding the apertures by placing a photosensitive filler material in the apertures which hardens when the material is subjected to light. For the purposes of this invention, such a photosensitive material is sometimes referred to as a photo-hardenable material. Its chemical composition is not known to applicant and is believed to be kept a trade secret by its manufacturer, The Dynachem Corporation of Santa Fe Springs, Calif. Dynachem commercially sells the material under the trademark "LS-500." LS-500 is a liquid, photosensitive, thermalsetting resin which converts to a 100% solid material on exposure to actinic radiation. When cured by light the converted solid is irreversible and infusible to subsequent solvent and thermal exposure. LS-500 can be exposed using most of the light sources that emit high intensity radiation in the 320-380 millimicron region of the spectrum. Oxygen retards the curing of LS-500, therefore, it should be exposed under a blanket of nitrogen or a one mil film of polyethylene terephthalate. Furthermore, as used in this specification and in the appended claims, the term "light" includes all radiant energy whether or not it is visible.

In accordance with the present invention, relatively small size apertures in the order of about 10 to 12 millimeters down to fractions of a millimeter in a sheet are filler masked to prevent the subsequent plating of the apertures by affixing a facing to one side of the sheet and filling the aperture from an opposite side of the sheet with a photo-hardenable material. The material is then exposed to radiant energy to solidify it. Thereafter, the sheet is first submerged in an electroplating bath for electroplating at least portions of the sheet surface without plating the apertures and the sheet then is submerged in a bath for dissolving the photo-hardenable material and bare the apertures.

The facing applied to the one side of the sheet is preferably constructed of a material which is dissolvable in the same dissolving agent in which the photo-hardenable material is dissolved and which permits passage of the radiant energy. A radiant energy source, e.g., a light source, is placed on each side of the sheet during the step of exposing the material to enhance the speed with which the material is hardened over its full thickness, e.g., over the full length of the aperture. The employed light source further preferably supplies collimated light to assure a uniform and homogeneous exposure of the photo-hardenable material.

The photo-hardenable material is applied to the sheet after the facing has been applied thereto by spreading the readily deformable, plastic material over the sheet and rolling or otherwise pressing the material into the apertures. Excess material is removed from the sheet prior to the electroplating step by squeegeeing it therefrom. The application of the photo-hardenable material, whether it be "LS-500" or another photo-hardenable material that is now or may in the future become available is easily and rapidly performed to minimize manufacturing costs. Once the material is in the apertures, it hardens without shrinkage from exposure to the light and it firmly adhers to the aperture walls so that the sheet can be readily stored, transported and subjected to shock or vibrations without shaking it loose before the sheet is immersed in the electroplating bath. Moreover, after the electroplating the photo-hardened material is speedily and inexpensively removed by merely submersing the whole sheet in a dissolving agent for the photo-hardenable material. Conventional manufacturing steps, such as shearing the sheet into small size parts or frames are then performed.

Thus, it can be seen that the present invention substantially reduces manufacturing costs for applications in which large numbers of relatively small size apertures must be masked. The invention assures excellent adherance of the plastic filler to the lead frame base metal without the need for removing excess plating therefrom at substantial expense. The invention is ideally suited for use in the manufacture of lead frames although other advantageous applications of the invention will come readily to mind to those skilled in the art.

DESCRIPTION OF THE PREFERRED EMBODIMENTS

Figure 1:
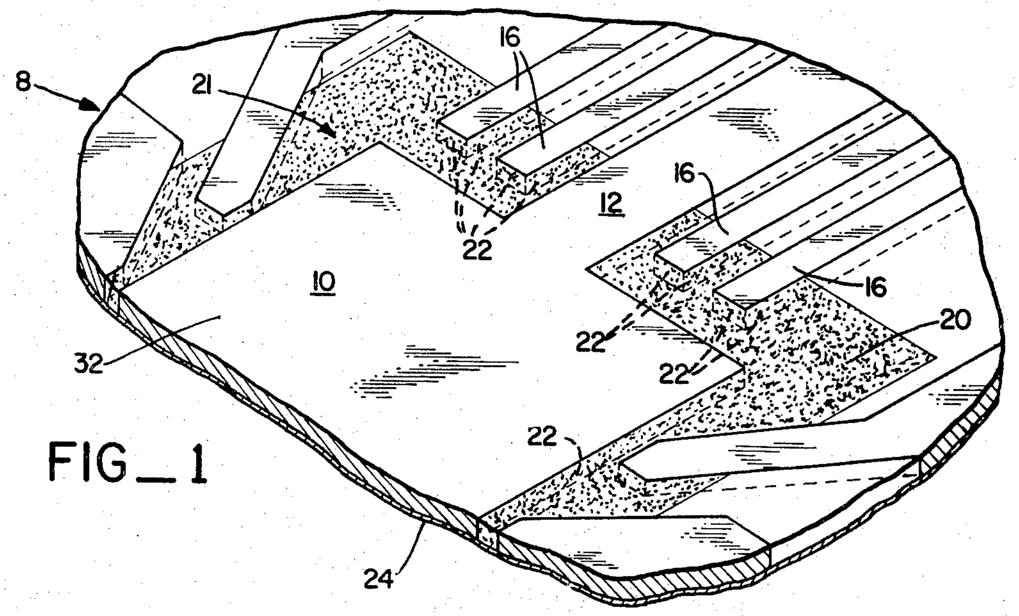
FIG. 1 is a fragmentary side elevational, perspective view which illustrates a center portion of a lead frame after small apertures or passages in the frame have been filler masked and electroplated in accordance with the invention.
Figures 2, 5:
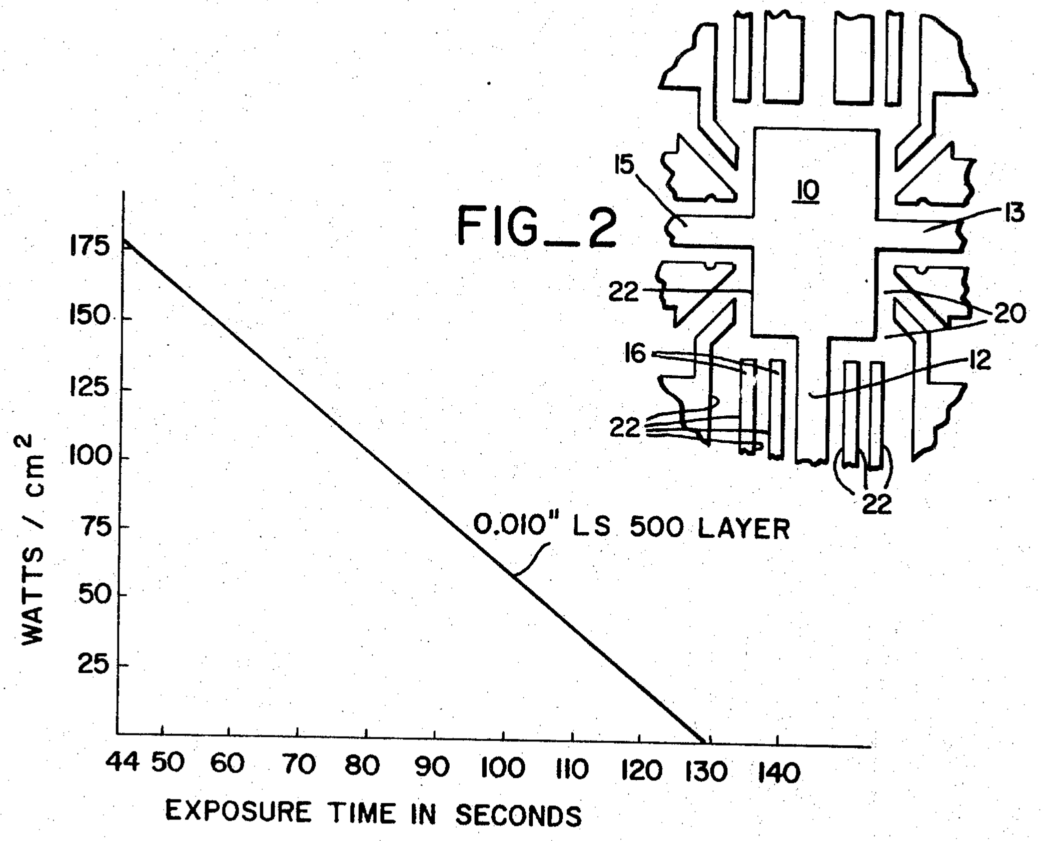
FIG. 2 is a fragmentary plan view of a plurality of lead frames that were plated in accordance with the invention and before they are severed from a larger sheet.
FIG. 5 is a diagram showing the relationship between light intensity and exposure time for a photo-hardenable material layer of 0.010 inch thickness.
Figure 3:
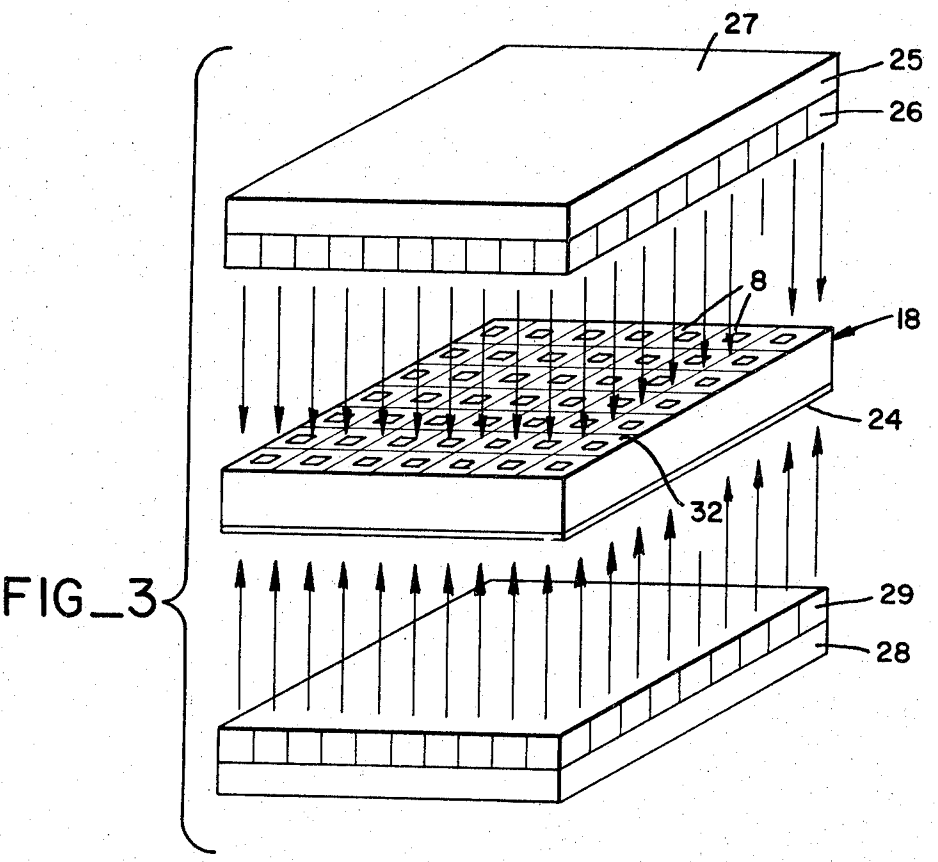
FIG. 3 schematically illustrates a sheet into which a multiplicity of lead frames have been etched, having its openings filled with a photo-hardenable material and being subjected to collimated light for photo-hardening the material.

Referring to FIGS. 1 and 2, a lead frame 8 generally comprises a center plate 10 connected to an outer portion 12 of the frame by one or more arms such as arms 13 and 15. A plurality of connectors 16 of various shapes and sizes extend from the outer frame portion to adjacent the periphery of center plate 10 but are spaced from each other and from the center plate. In the manufacture of a semiconductor device, a semiconductor chip or transistor (not shown) is placed on the center plate, soldered up with the various connectors and then fixed in place by applying a hardenable plastic sealant or the like over the chip and the soldered joints. Thereafter, the semiconductor device is severed from the outer frame portion 12 by shearing arms 13 through 15 and connectors 16 so that the arms and the connectors form terminals of the device.

To assure high electric conductivity the surfaces of center plate 10, the arms 13 and 15 and connectors 16 which come in contact with the semiconductor chip and/or are soldered thereto, are usually gold plated to facilitate the soldering operation. To assure the subsequent adherance of a plastic sealant of the finished semiconductor device to the lead frame base metal instead of the plating metal and to reduce gold consumption during the plating process, the spaces between the arms, the connectors and the center plate are masked to prevent the plating of such spaces. The present invention is particularly concerned with the efficient high quality masking of the spaces.

In the high volume manufacture of lead frames, large sheets 18 are etched to define therein a multiplicity of individual lead frames 8. All lead frames of one sheet are simultaneously electroplated and thereafter the sheet is severed into strips or individual frames prior to the application of the semiconductor chip and the soldering operations. Thus, before the sheet is plated the spaces or passages, generally identified with reference numeral 20, that had been stamped out of the sheet are masked by applying thereto a photo-hardenable material 21, preferably the above described "LS-500" material, so that the material fills all such spaces, provided no plating is desired in any of the passages, to prevent the electrolyte from contacting passage defining walls 22 when the sheet is immersed in an electroplating bath.

The photo-hardenable material is applied to the sheet in accordance with the invention by first adhering a facing 24 to one side of the sheet. The facing can be of any suitable material such as masking tape but preferably comprises a photoconductive material which permits light of a frequency range of between about 3,280 Angstrom to about 3,720 Angstrom to pass therethrough for purposes more fully described hereinafter. One particularly suitable material comprises a photosensitive polymer that is commercially available from the DuPont Company of Wilmington, Del., under the trademark RISTON. That polymer is supplied in thin films and is adhered to sheet 18 by placing it over the sheet and then heating the polymer to about 225°F. with a heated roller (not shown) which simultaneously flattens the polymer against the sheet. Upon cooling the polymer film adhers to the sheet. For purposes more fully described hereinafter, it is particularly advantageous to employ a facing, such as the above described RISTON film which can be dissolved in the same solution as the photo-hardenable material.

RISTON is a photopolymer film resist comprising a non-liquid three-layer sandwich of 0.001 inch transparent polyester film and polyethylene with a pre-dyed, pre-sensitized resist in between. The film resist is coated to a uniform thickness under clean room conditions and protected from dirt and dust by the cover sheets until it is used. RISTON is a negative film resist; unpolymerized or unexposed portions of the film are dissolved and removed when placed in a developing solvent.

After facing 24 has been applied a quantity of photo-hardenable material 21 is placed on the side of sheet 18 opposite the side to which the facing is applied. With a roller (not shown) or a draw bar (not shown) the plastically deformable, paste-like photo-hardenable material is forced into passages 20 until they are filled. Thereafter, excess material is removed from sheet 18 by sliding a resilient member (not separately shown) across the uncovered side of the sheet to thereby remove all photo-hardenable material not disposed in a passage 20 and to assure that the passages are filled so that the photo-hardenable material is flush with the sheet.

Referring now to FIGS. 1 through 3 and 5, photo-hardenable material 21 is hardened by subjecting it to light of a wave length between about 3,280 and 3,720 Angstrom for the above described "LS-500" material. Furthermore, the light from a source 27 is preferably passed through a collimator 26 to collimate the light and assure that the photo-hardenable material is substantially uniformly exposed to the light. The light intensity can be varied and suitably increased or decreased which requires a corresponding decrease or increase, respectively, in the exposure times for the photo-hardenable material as illustrated by the diagram of FIG. 5. That diagram illustrates the required exposure times for various light intensities expressed in watts per square centimeter for an "LS-500" layer of a thickness of 0.010 inch. Thicker or thinner layers require a linearly longer or shorter exposure time, respectively. Thus, an "LS-500" layer of 0.020 inch at a light intensity of about 125 W/cm² necessitates an exposure time of about 140 seconds.

To reduce the required exposure time it is preferred to subject the photo-hardenable material 21 in passages 20 of sheet 18 to collimated light from both sides of the sheet. For that purpose, a second light source 28 with a second collimator 29 is provided and facing 24 is constructed of the above referenced photosensitive polymer which permits the passage of light from second light source 28 to the photo-hardenable material in passages 20. Total exposure times can thereby be about halved. After the exposure of the photo-hardenable material to light of sufficient intensity and for a sufficient time period to substantially completely harden it without shrinkage and separating it from passage walls 22, which can result from time and/or intensity overexposures beyond about the limits indicated by the diagram of FIG. 5, sheet 18 is ready for plating. Bare side 32 of the sheet may be partially masked in accordance with various methods which do not form part of this invention to limit the area of side 32 that is to be plated.

Figure 4:
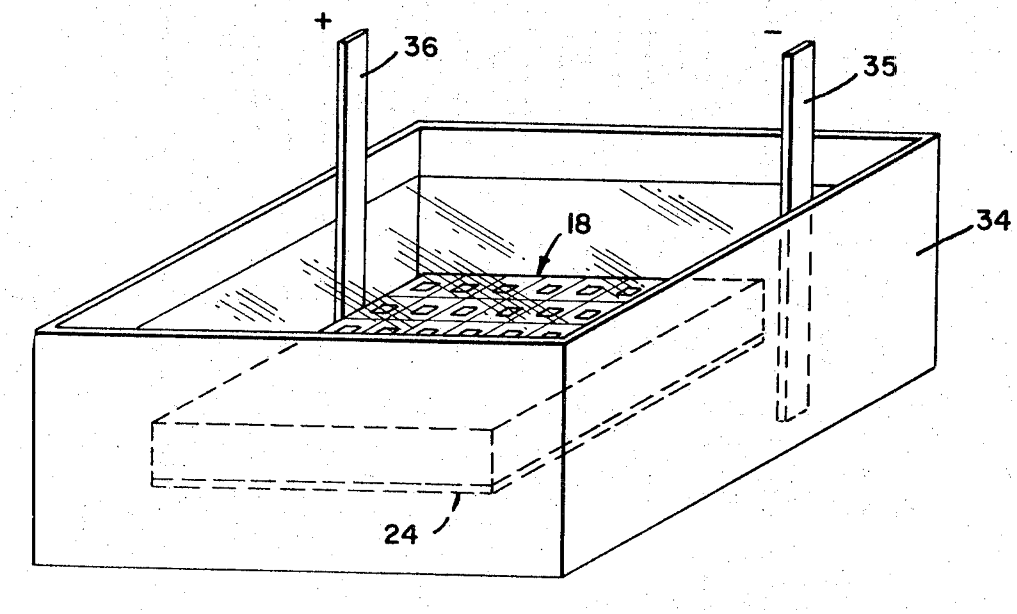
FIG. 4 is a schematic side elevation of an electroplating and/or a dissolving tank.

Referring now to FIGS. 1, 2 and 4, after the light exposure of the photo-hardenable material 21 passages 20 of sheet 18 are blocked by the hardened material 21 and the sheet can be immersed in a tank 34 that contains the desired electrolyte and an electrode pair 35, 36 for plating those portions of the surfaces of the sheet not masked or covered by facing 24, the photo-hardenable material, and any masking (not shown) that may have been applied to bare sheet side 32.

After completion of the electroplating step sheet 18 is withdrawn from the electrolyte and immersed in another tank 34 which contains a solution capable of dissolving the photo-hardenable material 21 and, preferably, capable of simultaneously therewith dissolving facing 24. When the photo-hardenable material comprises "LS-500" and facing 24 is constructed of RISTON dry film a potassium hydroxyde solution comprises a relatively low cost dissolving agent for both materials. After both the photo-hardenable material and the facing have been completely stripped sheet 18 is withdrawn from the tank, washed and dried and severed into lead frame strips or individual lead frames 8 for further work as briefly outlined above.

Although this invention has been described in connection with the manufacture of lead frames having gold plated surfaces it is obvious that it can be employed for the manufacture of other articles. Furthermore, it might be desirable to apply the photo-hardenable material to only some of the spaces or passages extending across the sheet thickness, or after masking the sheet may be etched, painted, sprayed or otherwise surface treated. Additionally, the physical configuration of the spaces, the sheet and the final product may vary widely from that shown in the drawings.

I claim:

1. A sheet for selectively electroplating surface portions thereof comprising a flat metallic sheet member including a plurality of passages extending through the member perpendicular to sides thereof, the passages being defined by walls extending from one side of the member to another side thereof, the walls being spaced apart up to about 10 to 12 millimeters, a thin film of a photo-conductive material releasably adhered to said one side of the member and closing one end of the passages, and a photo-hardenable material disposed in and completely filling the passages, having a thickness corresponding to the thickness of the member and contacting the full extent of the walls defining such passages between the sides of the member to prevent the plating of the walls when the sheet is submerged in an electro-plating bath, the photo-conductive material permitting passage of the radiation energy which hardens the photo-hardenable material.

* * * * *